INVENTOR.
JIRI HRDINA
BY
Attorney

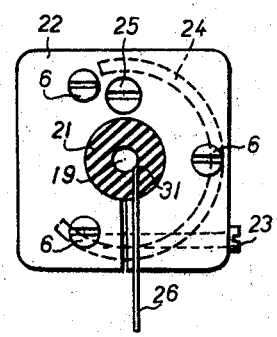
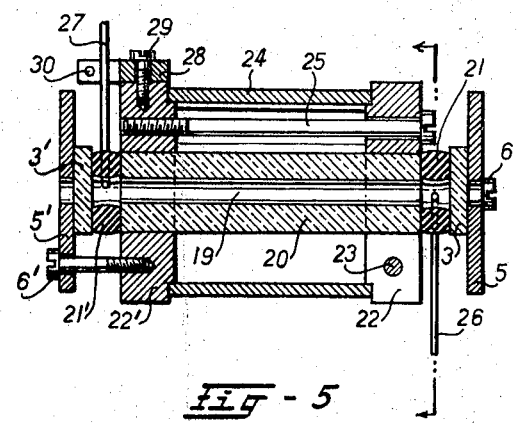
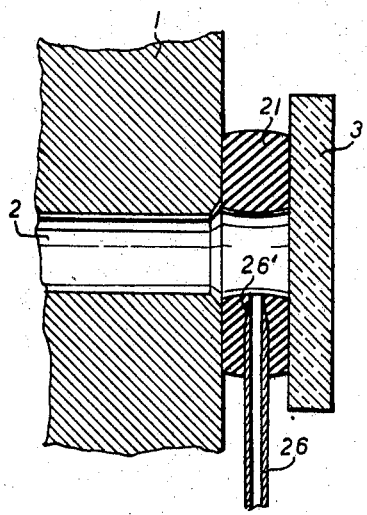
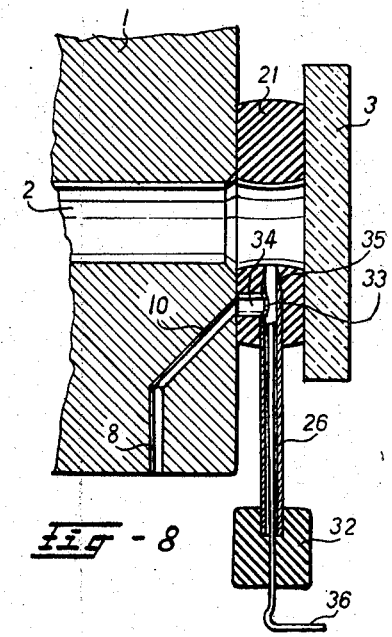
INVENTOR.
JIRI HRDINA

United States Patent Office 3,524,709
Patented Aug. 18, 1970

3,524,709
MEASURING CELL FOR THROUGH-FLOW PHOTOMETERS
Jiří Hrdina, Prague, Czechoslovakia, assignor to Ceskoslovenska akademie ved, Prague, Czechoslovakia
Filed May 24, 1966, Ser. No. 552,624
Claims priority application Czechoslovakia,
May 27, 1965, 3,458/65
Int. Cl. G01n *21/06, 1/10;* G01j *3/46*
U.S. Cl. 356—246      4 Claims

ABSTRACT OF THE DISCLOSURE

A flow-through measuring cell having a body member with a fluid receiving elongated channel receiving light beams in its longitudinal direction and transparent windowlike members at the entrance and the outlet end of said channel closing the same. An elastic ringshaped washerlike member is arranged between the cell body member and at least the transparent windowlike entrance member, the ring opening substantially extending the elongated channel, and pressing means act on the windowlike members to adjust the compression of the washerlike member. An inlet and an outlet tubing leads fluid to be measured at each end in and out of the channel, its communicating opening with the channel being adjustable through the elastic embracing washerlike member by varying its compression.

---

This invention relates to measuring cells for through-flow photometers. Such cells comprise within a cell body an elongated measuring channel or bore which is closed at each end by a transparent member and which is passed in longitudinal direction by the measuring photorays and by the liquid to be measured fed into and taken out from the bore by a tubing entering the same at each end thereof.

This invention relates to means for governing the flow of the liquid through the measuring bore and comprises means for changing the exit opening of the inlet tube carrying the liquid into the measuring cell and possibly also the inlet opening of the exit tube carrying the liquid from the measuring cell. In accordance with this invention said governing is accomplished by elastic substantially ringshaped washerlike members having a central opening extending the measuring bore of the cell, said ringshaped members being placed between the cell body and its cooperating transparent members and being adjustably pressed therebetween to change the size of communication between the measuring bore and at least the inlet tubing.

Figure 1:
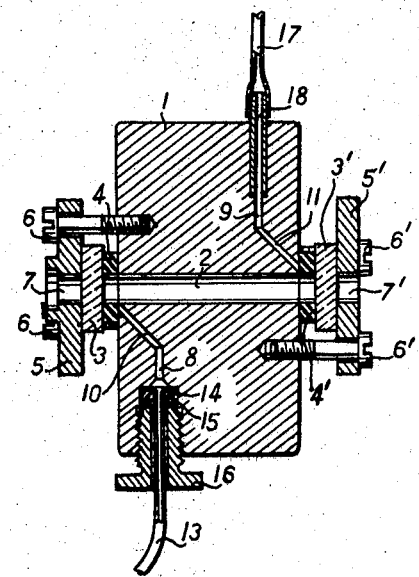
Figure 2:
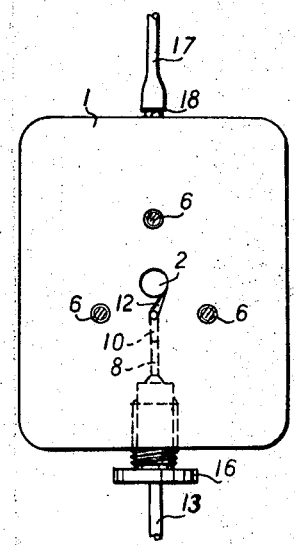
Figure 4:
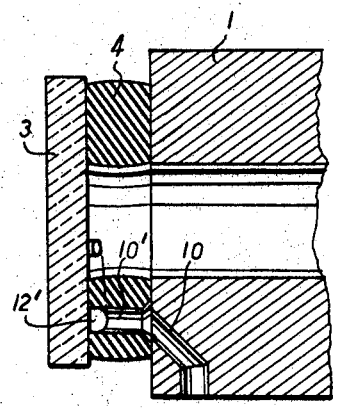
Figure 3:
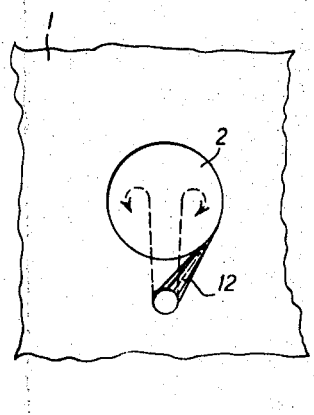

The appended drawings show embodiments of the invention. FIG. 1 is a longitudinal section of a measuring cell; FIG. 2 is a view of the main body of the measuring cell indicated by line II—II of FIG. 1 in the direction of the impeding light rays; FIG. 3 is an enlarged detail of the supply groove according to FIG. 2; FIG. 4 shows an alternative embodiment; FIGS. 5 and 6 show, respectively, a longitudinal section and a view along line VI—VI of FIG. 5 in the direction of the impeding light rays of the measuring cell of an alternative embodiment, and FIGS. 7 and 8 suggest in sectional views still other embodiments of the supply of liquid into the measuring space of the cell.

The measuring cell according to FIGS. 1 to 3 consists essentially of a main body 1 including a bore forming the measuring cell space 2. The front walls of the space 2 are formed by transparent plates 3, 3' which are pressed to the body 1 over sealing rings 4, 4' by thrust plates 5, 5' actuated by tightening screws 6, 6'. The thrust plates 5, 5' have centric holes 7, 7' aligned to the measuring cell space 2. The necessary centricity thereof is secured either by precisely bored holes for the screws 6, 6' or by special centering pins not shown in the drawing. The transparent plates 3, 3' may be either of ordinary or special glass, quartz and the like, according to the desired spectral transmittancy. The main body 1 may be of stainless steel or preferably of any suitable transparent material.

The flow of the measured liquid through the space 2 of the measuring cell, with a simultaneous turbulent mixing of the content therein, is secured by a supply channel 8 in the lower part of the body 1 of the measuring cell and by an outlet channel 9 on the opposite side in the upper part of the body 1 of the measuring cell. The bent off parts 10 and 11 of these channels 8 and 9 terminate in the front and end wall, respectively, of the main body 1 near the bore 2 and are covered by the sealing rings 4 and 4'. The communication between the channel parts 10 and 11 and the space 2 of the measuring cell is achieved by grooves 12 and 12' of which the supply groove 12 is shown in an enlarged scale in FIG. 3. This groove 12 terminates approximately tangentially into the measuring space 2 within the cell and a narrowing entrance section into the space 2 of the measuring cell to secure not only a proper washing of the internal surface of the transparent window 3, 3' but also their proximate space. The cross section of the entrance opening of groove 12 into the space 2 of the measuring cell can be to a certain extent adjusted during operation of the measuring cell by tightening the screws 6, whereby the pressure transmitted by the plate 5 on the sealing ring 4 will produce the desired adjustable deformation, if the sealing ring 4 is made of a sufficiently elastic material and has a sufficient thickness. Such adjustment has to be particularly considered in order to prevent the ever threatening choking of the narrowest passage. By lessening a previously greater pressure it is possible to enlarge to a certain extent the communication and the washing out of a caught impurity. As evident, all parts of the measuring cell and especially the supply and outlet grooves 12, 12' are easily accessible after dismantling the screws 6 and 6' and this substantially facilitates the cleaning of all surfaces required after a certain time of operation.

The not shown supply groove opening into the channel 11 may be similar to the groove 12 though it need not necessarily enter tangentially into the space 2 of the measuring cell. Even with a radial entry or exit of such grooves with other circumstances otherwise preserved, a certain turbulence will be accomplished as shown in FIG. 3 by arrows in broken lines.

FIG. 1 shows two possible ways of connecting the outer tubings 13 and 17 to the measuring cell. The lower part of FIG. 1 shows schematically the connection of the supply hose 13 to the channel 8 by an elastic sealing cuff 14 compressed over a metal ring 15 by the adjustable pressure of a hollow packing screw 16. The upper part of FIG. 1 shows the connection of a discharge hose 17 by merely sliding it on a tubular needle 18 which is so pressed into the body 1 that its tubular passage forms a continuation of the channel 9 bored in the body 1.

The groove 12 in the embodiment of FIGS. 1 and 2 may be either on the frontal face of body 1 or on the opposing surface of the sealing ring 4. In this case it is advisable that the ring 4 be thicker than shown in FIG. 1. By adjusting the thrust of the plate 5 over the transparent plate 3 it is possible to accomplish a change in the cross section of the through-flow cross section of the groove 12 and thus achieve both a change in the outlet velocity of the liquid flowing into the space 2 as well as of washing away impurities which perhaps may have stuck in this place.

According to FIG. 4 it is also possible to alter the arrangement in such way that the groove 12' is on the surface of the sealing ring 4 bearing on the transparent plate 3. Connection with the channel 10 is realized by a hole 10' through the sealing ring 4 and the supplied liquid flows as closely as possible along the inner wall of the transparent plate 3.

In the embodiment according to FIGS. 5 and 6 the measuring space 19 is within a thick-walled glass tube 20 which is closed at its ends similarly as in the case of FIGS. 1 and 2 by transparent plates 3, 3' pressed to the tube 20 over sealing rings 21, 21' by means of thrust plates 5, 5' tightened by tightening screws 6, 6'. These screws engage transparent flanges 22, 22' which when cemented to the tube 20 provide full transparency even of the end portions of the measuring cell. In addition to or instead of being cemented, these flanges can be provided with a cut and fixed on the ends of the tube 20 by clamping screws 23, as shown in the right hand part of FIG. 5. For increasing the mechanical strength of the unit both flanges 22, 22' may be spaced for example by a tube 24 to which they are axially drawn by one or more screws 25. The spacing tube 24 may be on its circumference partly cut through as shown in dotted lines in FIG. 6, so that even in case of its non-transparent material it does not interfere with a direct visual observation of the operation of the measuring cell.

The supply and the outlet of the measured liquid may be arranged in a similar manner by means of grooves as in the arrangement according to FIGS. 1 to 3. But in the arrangement according to FIGS. 5 and 6 the supply and the outlet tubings 26 and 27, respectively, for the liquid lead directly, possibly over hollow needles into the sealing rings 21 and 21' which in this case must be sufficiently thick. The tubings 26, 27 or the interposed needles may be fastened to the apparatus by a clamping flange 28 fastened by screw 29. An adjusting screw 30 permits to adjust the force with which the flange 28 clamps the tubing 27 or its needle.

The exit opening 31 of the supply tubing 26 is evident from FIG. 6. This opening 31 may have a reduced cross section to increase the inlet velocity of the liquid and thus its turbulent effect and the tubing 26 may enter tangentially the cross section of the measuring space 19 of the cell.

FIGS. 7 and 8 show other admissions of the liquid into the measuring space 2 of the cell terminating in the sealing ring 21. According to FIG. 7 the needle-shaped tube 26 is in its upper end pointed and possibly narrowed and terminates in a narrow hole 26' of the elastic sealing ring 21. By adjusting the insertion of the needle 26 it is possible within certain limits to change the size of the inlet hole determining the velocity with which the liquid enters the space 2 of the measuring cell.

FIG. 8 shows an arrangement where the hollow needle 26 is provided with an inset 36 made of hard wire. This inset 36 can be used to clean the hollow needle-shaped tubing 26 in case of choking. The inset 36 is sealed towards the tubing 26 by an elastic stopper 32 which permits the inset 36 to be moved without impairing the tightness of the sealing. The tubing 26 is provided near its exit end with a lateral inlet hole 33 which communicates over a short channel 34 in the sealing ring 21 with channels 10 and 8 in the body 1 of the measuring cell. The tubing 26 and possibly also the stopper 32 may be attached to the body 1 as shown in FIG. 5 by means of a member corresponding to the clamping flange 28.

If the inset 36 is pointed at the end it can permit regulation of the outlet velocity of the liquid, the narrowed outlet end 35 of the tubing 26 together with the pointed inset 36 functioning similar to the control needle in the outlet jet of Pelton wheels.

After removing the stopper 32 it is possible to slide on the lower end of the tubing 26 a not shown hose which will serve for washing out not only the tubing 26, but also the content of the measuring cell with a suitable solution for example with the help of a syringe. By alternating the discharge and the suction of such syringe it is possible to wash off impurities which may have stuck in the tubing 26 or in the supply and outlet channels. In such case it is however suitable to interrupt the connection of the channel 34 with the tubings 8 and 10 normally connected therewith. By a suitable selection of the rinsing liquid, especially if the same is under a greater pressure and consequently has greater flow velocities, it is possible to accomplish the removal of stubbornly adhering deposits without necessitating disassembly of the measuring cell.

I claim:

1. A flow-through measuring cell comprising a body member with a fluid receiving elongated channel for passing light beams therethrough in a longitudinal direction along the longitudinal axis of said channel and said channel having a fluid end and a fluid outlet end; transparent windowlike members at the inlet and the outlet ends of said channel closing the channel; an elastic ring shaped member between the cell body member and at least the transparent windowlike member at the inlet end; the ring opening substantially extending across the diameter of the elongated channel; an inlet tubing and an outlet tubing for the fluid to be measured each communicating respectively with the inlet and outlet ends of the channel; at least the inlet tubing passing through the elastic ring shaped member and having an opening in fluid communication with said channel and the size of said opening being changeable by the compression of said elastic ring shaped member.

2. A flow-through measuring cell according to claim 1 including pressing means acting at least on the transparent inlet member to compress said elastic ring shaped member between said transparent windowlike member at the inlet end and said body member, said pressing means being adjustable to change the compression of the elastic and thus the communicating opening between the inlet tubing and the channel.

3. A flow-through measuring cell according to claim 1 wherein said inlet tubing includes a needle-shaped inlet tubing portion passing in longitudinally adjustable manner through the elastic ring shaped member into the channel in a direction substantially vertical to the longitudinal axis of the channel.

4. A flow-through measuring cell according to claim 1 wherein said inlet tubing includes an inlet tubing portion passing through the elastic ring shaped member in a direction parallel to the longitudinal axis of the channel toward the transparent windowlike member at the inlet end and a groove in said elastic ring shaped member receiving the terminal of the inlet tubing portion and leading into the channel.

References Cited

UNITED STATES PATENTS

| 3,263,554 | 8/1966 | Pickels. |
| 3,332,316 | 7/1967 | Saunders. |
| 3,333,107 | 7/1967 | Hubbard et al. |
| 3,381,134 | 4/1968 | Wolf _____ 250—218 |
| 3,289,527 | 12/1966 | Gilford et al. _____ 88—14 |

RONALD L. WILBERT, Primary Examiner

W. A. SKLAR, Assistant Examiner

U.S. Cl. X.R.

250—218